June 19, 1956 R. C. KOCH 2,751,444

STABILIZER FOR RADIO FREQUENCY AMPLIFIER

Filed May 21, 1952 3 Sheets-Sheet 1

INVENTOR.
RICHARD C. KOCH,
BY: George A. Gust.
ATTORNEY.

INVENTOR.
RICHARD C. KOCH,
BY:
George A. Gust.
ATTORNEY.

STABILIZER FOR RADIO FREQUENCY AMPLIFIER

Filed May 21, 1952 3 Sheets-Sheet 3

INVENTOR.
RICHARD C. KOCH,
BY: George A. Gust.
ATTORNEY.

United States Patent Office 2,751,444

Patented June 19, 1956

2,751,444

STABILIZER FOR RADIO FREQUENCY AMPLIFIER

Richard C. Koch, Indianapolis, Ind., assignor to Industrial Development Engineering Associates, Inc., Indianapolis, Ind., a corporation of Indiana Application May 21, 1952, Serial No. 289,221

12 Claims. (Cl. 179—171)

The present invention relates to a stabilizer for a radio frequency amplifier and more particularly to an arrangement for neutralizing the coupling effects of the grid-to-plate capacitance of the two sections of a push-pull triode amplifier.

The principles and purposes of balancing out or neutralizing the capacitive coupling effects between the grid and plate of a vacuum tube amplifier are well known and, therefore, need not be indulged in for an explanation of this invention. However, since the present invention has particular utility in television booster circuits, it is well to recognize at this point that the operation of push-pull type booster circuits are materially improved by use of the present invention.

Heretofore, the use of "6J6" type vacuum tube in television boosters has been attended with neutralization difficulties which deleteriously affected the booster performance. For this reason, tubes which were more easily neutralized, such as tetrode or pentode types, but which did not have as high gain factor as the 6J6, were preferred. By following the teachings of the present invention, the superior performance of the 6J6 circuit is availed of by the elimination of the former neutralizing difficulties.

In improving the gain, signal-to-noise ratio, and stability of the 6J6 booster, improved neutralization over the operating range of between fifty-four (54) megacycles and two hundred sixteen (216) megacycles was required. This requirement included the neutralization of both the grid-to-plate capacity and the inductance of the grid and plate leads. It is, therefore, an important object of this invention to satisfy this requirement.

It is another object of this invention to improve the performance of a booster circuit whereby maximum, stable gain of the circuit may be realized.

It is a further object to provide a neutralizing circuit assembly which may be readily affixed in position in an amplifier circuit, and which is easily and simply adjusted to achieve neutralization of the amplifier.

A still further object is to provide a neutralizing circuit which requires but one adjustment to achieve exact balance in the two sections of a push-pull triode amplifier circuit.

Still further objects will become apparent as the description proceeds.

Figure 1:
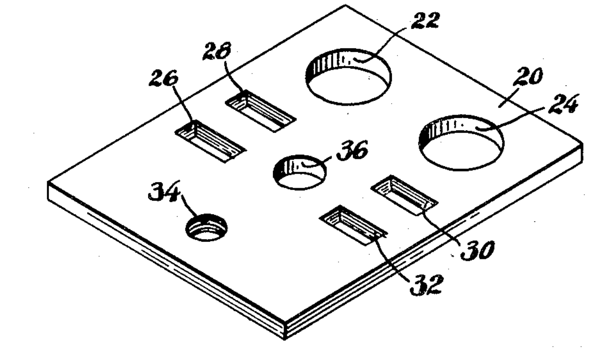
Figure 1 is a perspective illustration of a fiber base used in an embodiment of the present invention.
Figure 2:
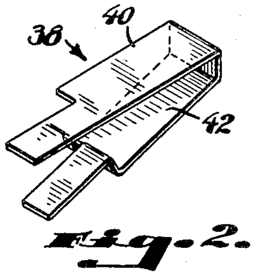
Figure 2 is a similar illustration of one capacitor section or plate which in the disclosed embodiment is common to one neutralizing capacitor and the plate tuning capacitor.
Figure 3:
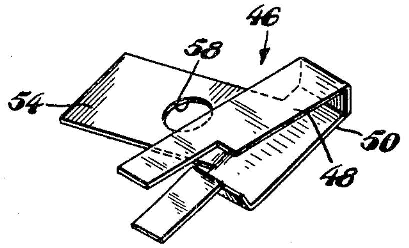
Figure 3 is a similar illustration of another capacitor section which is common to another neutralizing capacitor and said plate tuning capacitor.
Figure 4:
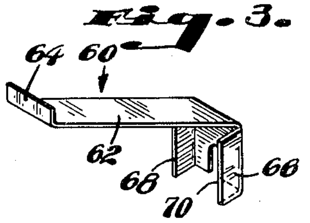
Figure 4 is a perspective illustration of one of two identical capacitor sections used in conjunction with one of the sections shown in Figures 2 or 3.
Figure 6:
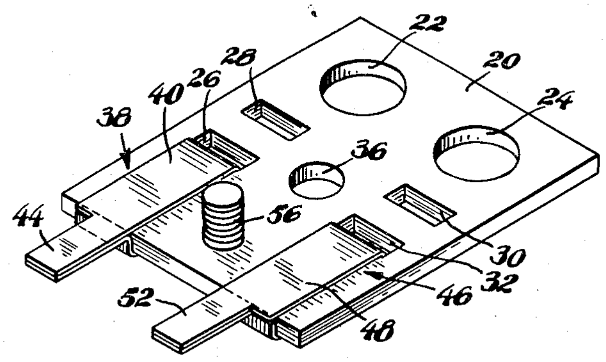
Figure 7:
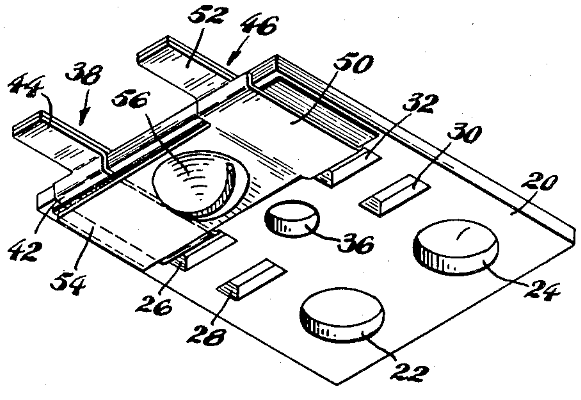
Figure 5:
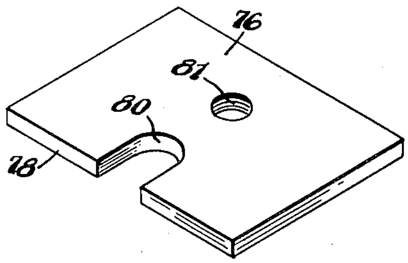
Figures 8, 9, 10, 11, 12:
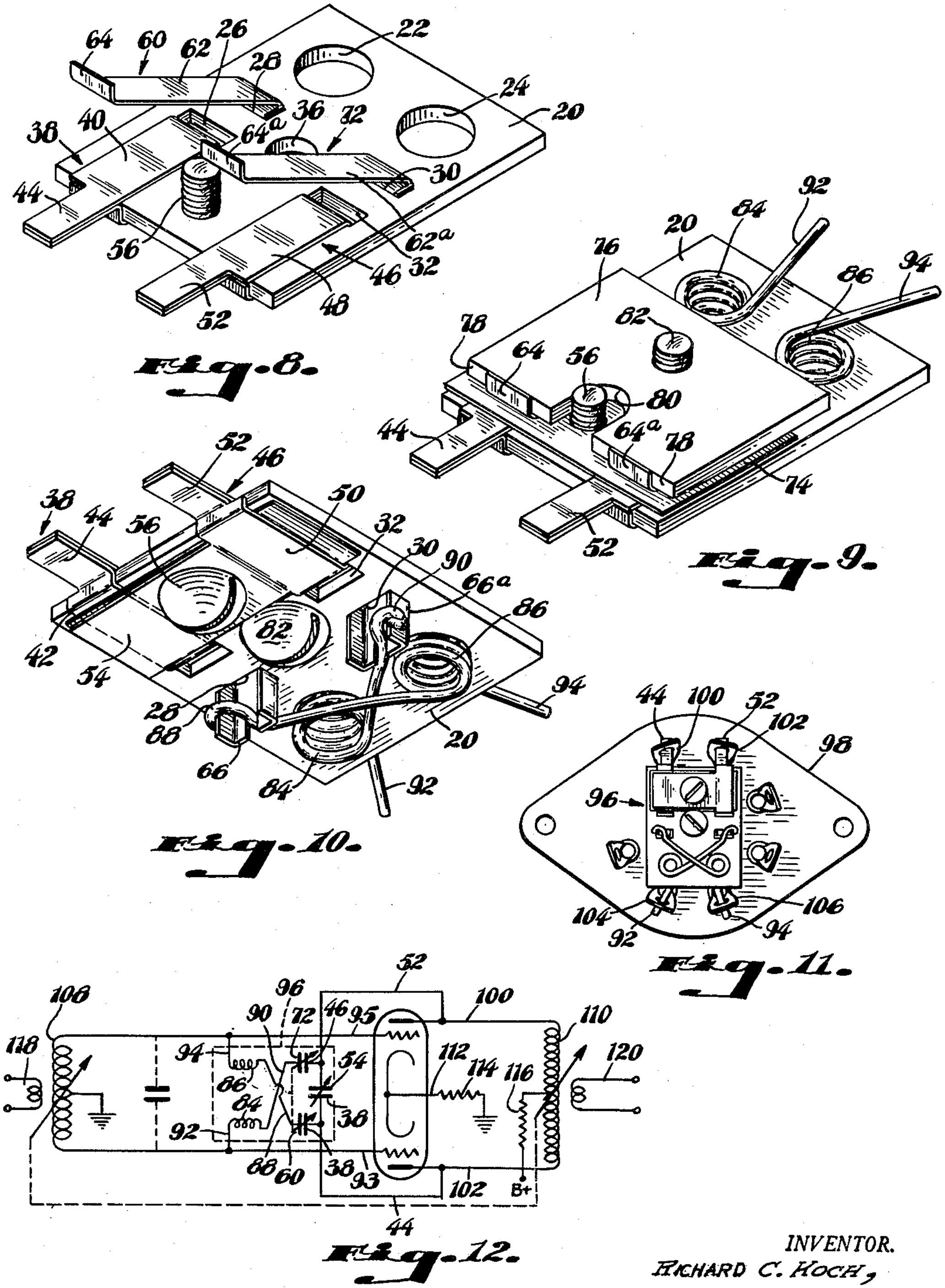
Figure 13:
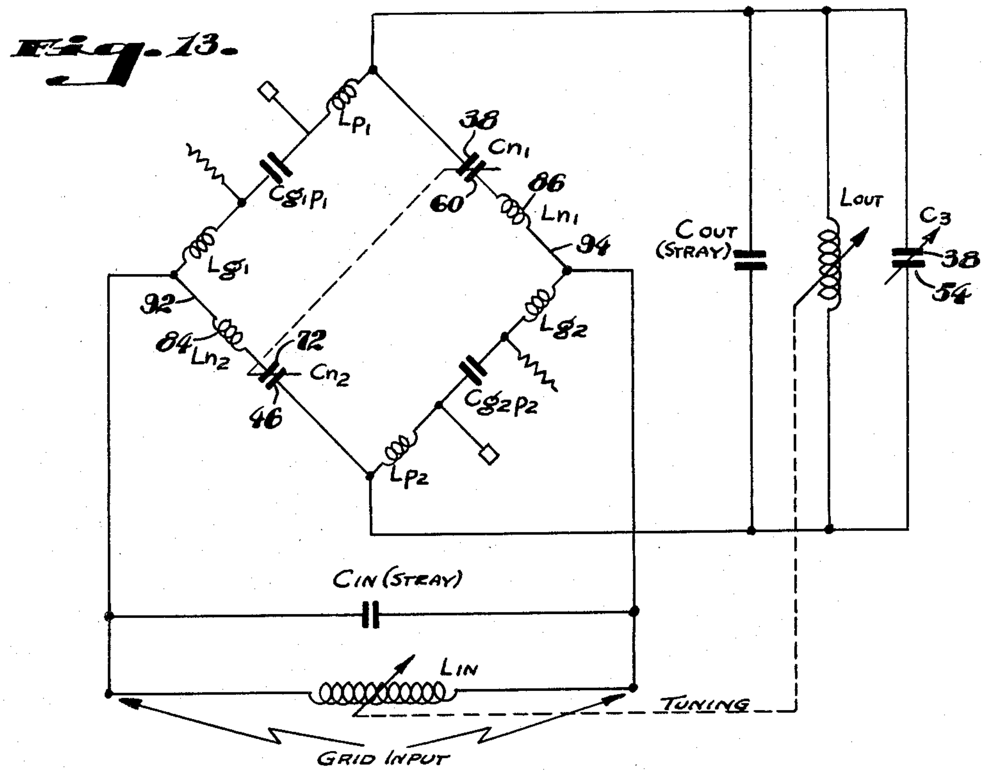
Figure 14:
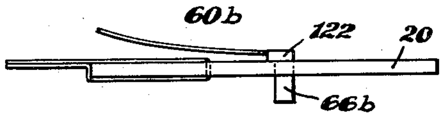
Figure 15:
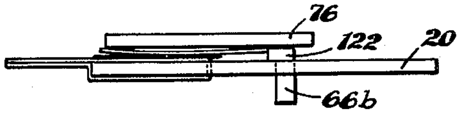

Figure 5 shown in perspective a fiber plate for adjusting the neutralizing capacitors;

Figure 6 shows the plates of Figures 2 and 3 assembled to the base of Figure 1;

Figure 7 is an illustration of the other side of the subassembly of Figure 6;

Figure 8 is a view similar to Figure 6 but with two capacitor plates as shown in Figure 4 in place;

Figure 9 is the same as Figure 8 but with the fiber plate of Figure 5 shown in assembled position and two neutralizing inductances installed in the fiber base of Figure 1;

Figure 10 shown the other side of the assembly of Figure 9;

Figure 11 is a bottom plan view of a tube socket with the device of Figure 10 assembled thereto;

Figure 12 is a circuit diagram of an embodiment of the present invention showing as a part thereof the device of Figures 10 and 11;

Figure 13 is an equivalent circuit diagram of the circuit of Figure 12;

Figure 14 is a partial illustration of another embodiment;

Figure 15 is a complete illustration of the embodiment of Figure 14; and

Figure 16:
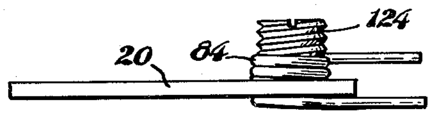

Figure 16 shows still another embodiment which provides for variation of the neutralizing inductance.

Referring to the drawings, a preferred mechanical embodiment of the present invention is illustrated in Figures 1 to 10. This embodiment is approximately the size of a postage stamp and comprises a flat fiber supporting base 20 of rectangular shape (Figure 1) provided with two round openings 22 and 24 symmetrically arranged on opposite sides of the base median line near one end of the base and with four rectangular openings 26, 28, 30, and 32, symmetrically arranged in pairs on opposite sides of the same median line, with only opening 34 being threaded for a purpose which will be explained hereafter.

In the assembly of this preferred embodiment, a condenser plate or stator 38 (Figure 2) formed of a length of sheet metal doubled back upon itself to provide two spaced, parallel legs 40 and 42, is passed through base opening 26 with the legs 40 and 42 straddling base 20 and extending forwardly in parallel relation to project beyond the forward base edge 21. The outer ends of these legs are brought together to form a terminal or soldering lug 44 (Figure 6), and to clamp the plate or section 38 firmly to the base 20.

Similarly, another condenser plate or stator 46 (Figure 3) is passed through base opening 32 and clamped onto base 20 with the legs 48 and 50 also extending forwardly to terminate in a lug 52. As clearly shown in Figure 6, both stators 38 and 46 are spaced apart in parallel relation and lie on opposite sides of and parallel to the aforementioned median line.

However, stator 46 differs from stator 38 in the feature of a laterally extending leaf 54 (Figure 3) which is preferably integral with leg 50. This leaf 54 is rectangular in shape and is of sufficient length to overlie leg 42 (see Figure 7) of stator 38. A mica or the like spacer is interposed between leaf 54 and leg 42 and may be clamped beneath leg 50 of stator 46. An adjusting screw 56 passes through an opening 58 in leaf 54 and into the threaded base opening 34, and may be rotated to adjust the spacing between leaf 54 and stator 38. Thus it is seen that a variable capacitor has been provided with the leaf 54 and stator 38 constituting the opposite sections thereof.

Continuing in the assembly in logical order, a neutralizing capacitor section 60 (Figure 4) having a single, flat plate 62 which is provided on one end with a right angle flange 64 and on the other end with a mounting lug 66, is assembled to one of the remaining rectangular openings 28 or 30. Assuming the opening to be 28 (see Figure 8), the lug 66 is inserted in this opening in such a manner that the part 62 extends over, in the same plane, the stator 38. As will be noted, this capacitor part 62 is normally inclined, and in the preferred arrangement is resilient. By applying top pressure thereto, the part 62 may be adjusted toward and away from the stator 38 thereby providing a variable capacitor.

The lug 66 is formed with side flanges 68 and 70 which snugly fit the width dimension of the base opening 28 thereby providing a means of rigidly securing the plate 60 to the base 20. As viewed in Figure 10, the lug 66 protrudes through the base 60 to provide a convenient terminal for attachment of a wire or other part thereto.

Since the plate 60 has an identical counterpart 72 which is mounted in base opening 30, for purposes of clarity, the same reference numerals will be used for like parts with the suffix "*a*" added thereto.

Both plates 60 and 72 are adapted to be superposed upon the legs 40 and 48, respectively, of the respective stators 38 and 46, and to form a pair of substantially identical variable capacitors therewith. A mica separator 74 is used to separate electrically the aforesaid legs 40 and 48 from the plates 60 and 62 (see Figure 9).

It being necessary to the accomplishment of this invention to adjust capacitor plates 60 and 72 identically with respect to their respective stators 38 and 46, a flat, fiber, tuning member or tuner 76 (Figure 9) is adjustably mounted on base 20 to simultaneously tune the plates 60 and 72. This type of tuning for a plurality of variable capacitors is characterized as gang tuning, and the utility thereof is well known to the art. This tuner 76 is rectangular and is superposed upon the two plates 60 and 72 with the forward edge 78 thereof abutting against the plate flanges 64 and 64*a*, respectively. This forward edge 78 is notched back at 80 to avoid interference with the end of screw 56. A screw 82 is passed through base opening 36 and into a companion threaded opening 81 in the tuner 76 for adjusting the proximity of the tuner with respect to the base 20 and to gang tune the two capacitors 38, 60 and 46, 72.

A pair of identical but oppositely wound inductors 84 and 86 are installed in respective base openings 22 and 24 and have outer diameters of such size which provide a snug, secure fit with said openings. As viewed in Figure 10, two corresponding leads 88 and 90 of the inductors are crossed and connected to lugs 66 and 66*a* respectively. The other two leads 92 and 94 extend rearwardly to provide convenient attachment lugs and extend oppositely from lugs 44 and 52.

Referring to Figure 11, the circuit stabilizing assembly, generally indicated by reference numeral 96, described in the foregoing, is shown mounted to the underside of a conventional tube socket 98 adapted for receiving a 6J6 or similar type vacuum radio tube. For a 6J6 type tube, the lugs 44 and 52 are fitted to the plate terminals 100 and 102, respectively, and the inductor wires 92 and 94 are inserted in the grid terminals 104 and 106, respectively. By this means of attachment, the entire assembly 96 may be quickly and easily installed on the tube socket. The procedure is extremely simple and readily adaptable for mass production purposes. The two adjusting screws 56 and 82 are completely exposed and accessible for adjustment. Furthermore and of particular significance is the fact that the arrangement as shown in Figure 11 is both mechanically and electrically balanced and free from objectionable lead or stray inductances which appear at the higher operating frequencies. All leads are desirably short and out of the way of other circuit component parts.

The arrangement of Figure 11 is shown diagrammatically embodied in a television booster circuit in Figure 12, this circuit being push pull in design and utilizing two triode sections such as are included in the single envelope of a 6J6 type tube. Briefly, a grid inductor 108 is connected between the tube grids 93 and 95, respectively, and a plate inductor 110, mechanically identical to the grid inductor 108, is connected across the plates 100 and 102. These inductors are gang tuned by means of identical powdered iron cores or slugs (not shown) in a manner well known in the art. It is important in this booster circuit that the grid and plate resonant frequencies be the same in order to insure proper tracking of the grid input with the plate output in tuning from one end of a band of operating frequencies to the other. The center of inductor 108 is grounded. The cathode 12 is placed above ground by resistance 114, and plate power (B+) is fed to the center of inductor 110 through a resistance 116. Coupling coils 118 and 120 are used for the grid and plate circuits, respectively.

Now the assembly 96 is included in the dotted line square in Figure 12. Corresponding numerals have been assigned to the parts of the circuit to facilitate correlation between the pictorial and diagrammatic illustrations.

The capacitor 38, 54 (C3) is used as a trimmer for adjusting the resonant frequency of the plate circuit 110 to the resonant frequency of the grid circuit 108. The capacitors 38, 60 ($Cn1$) and 46, 72 ($Cn2$) are neutralizing capacitors and are simultaneously adjustable to balance out the effects of the grid-plate capacitances of the two tube sections. Inductors 84 ($Ln2$) and 86 ($Ln1$) are the neutralizing inductances used to balance out the tuning or unbalancing effects of tube lead inductance for a comparatively wide range of operating frequencies. The circuit behavior of the foregoing will be explained in detail hereafter.

Another embodiment of the present invention is shown in Figures 14 and 15 in which all parts are the same as those of the foregoing description with the exception of the parts 60*b* which correspond, respectively, to parts 60 and 72 of the first described embodiment. Instead of having straight plates, these parts 60*b* have plates which are curved upwardly and tangentially with respect to the stators 38 and 46, respectively. The lugs 66*b* protrude a slight distance above the base 20 so as to provide a fulcrum 122 for the rear of tuner 76. With this arrangement, the plates 60*b* will be engaged at the forward ends thereof by the tuner 76 and be straightened, or flattened as the tuner 76 is drawn downwardly. The tuner 76 for the most part engages only the fulcrum 122 and the extreme opposite or forward ends of plates 60*b* until it has been drawn downwardly to the maximum extent. This arrangement assures fine tuning control of the capacities of the two condensers and the fullest capacities attainable with plates of given area. With the arrangement of Figure 9, for example, it is possible for the plates 62 and 62*a* to be slightly warped or bowed upwardly whereby the maximum capacities attainable for the capacitor dimensions might not be achieved even with the screw 82 turned down as tightly as permissible.

The plates 60*b* are, of course, formed of resilient sheet metal and may be formed similarly to all of the other metal parts already described. In the preferred form of this invention, the various plates and stators are stamped from sheet metal, a procedure common in mass production.

In Figure 16 is shown an arrangement for varying the inductance of the neutralizing inductors 84 and 86. A brass slug 124 having an external thread pitch equal to the inductor turn pitch is screwed into the inductor 84. The farther in the slug is turned, the lower the inductance of the coil becomes. This is particularly valuable in this invention, because it facilitates complete neutralizing balance of the lead inductances and completes the assembly 96 for achieving ideal capacitive and inductive neutralization.

Reference is now invited to Figure 13 which shows a diagram equivalent to that shown in Figure 12 to enable a complete understanding of this invention.

As stated earlier, an object is to neutralize the effects of grid-to-plate capacitance over a relatively wide frequency range. Since at high frequency, inductive reactance due to lead lengths becomes a quantity which must be reckoned with, the neutralizing circuit must contain inductances which tend to balance out, or equalize in effect, the lead inductances.

For relatively low frequencies where the inductance of lead lengths is negligible, the equivalent bridge circuit of Figure 13 of a neutralized push-pull triode amplifier circuit may be considered as not having any inductances, in which case the condition of neutralized grid-to-plate capacitance may be substantially represented by the formula:

$$Cg1p1\ Cg2p2 = Cn1\ Cn2$$

$Cg1p1$ and $Cg2p2$ representing the capacities between the respective grid and plates of the two triode sections, respectively, and $Cn1$ and $Cn2$ representing the two neutralizing capacities for the respective grid-plate capacities.

Assuming for the moment that neutralizing inductances $Ln1$ and $Ln2$ are shorted (or eliminated) and the operating frequency increased to what is commonly termed the "very high frequency range" (50 to 200 megacycles), the lengths of the circuit leads, and espectially the tube leads, constitute major component elements of the circuit and must be considered in determining the proper values of the circuit parameters.

In the illustrated neutralized bridge circuit, the inductive reactances of the tube leads ($Lg1$, $Lp1$, $Lg2$, and $Lp2$) must be considered as being in series with the respective capacitances between the grids and plates. Thus the net reactance of one leg of seriesed inductances and capacitance becomes the difference between the two reactances thereof. Thus, in order for the bridge to balance for any given frequency, i. e. the circuit to be neutralized, the product of the net effective capacitive reactances of the tube elements must equal the product of the capacitive reactances of the neutralizing capacitors. This balanced or neutralized condition may be obtained for almost any given single value of high frequency.

Now assuming that the operating frequency of the push-pull circuit is changed from the neutralized frequency, it will be found that the condition of balance or neutralization no longer exists. The cause of this may be attributed to the major significance of the tube lead inductive reactances which appreciably affect the net capacitive reactance measured between plate and grid lead terminals. It is estimated that the inductive reactance of the tube leads for a type 6J6 tube is in the order of ten percent (10%) of the capacitive reactance between plate and grid. Thus, with the frequency change, the product of the effective or net tube capacities no longer equals the product of the neutralizing capacities, or as represented by formula:

$$Cg1p1\ Cg2p2 = X \tag{2}$$

and $$Cn1\ Cn2 = Y \tag{3}$$

where X is not equal to Y.

It now becomes apparent that if the effective capacitive reactance of the neutralizing legs of the bridge can be automatically varied in accordance with the variations of the effective capacitive reactance of the tube elements due to operating frequency changes, the grid-to-plate capacitance may be neutralized over a band of operating frequencies. This is accomplished in the present instance by the addition of the inductances $Ln1$ and $Ln2$, so that with a change in operating frequency, the capacitive reactances of all bridge legs will be affected correspondingly.

In a typical push-pull radio frequency amplifier circuit using a 6J6 type of tube, the capacity between each grid and plate section approximates 1.5 mmf. Thus $$Cg1p1\ Cg2Cp2 \text{ becomes } 1.5 \times 1.5 \text{ or } 2.25 \text{ mmf.}$$

The product $Cn1\ Cn2$ must then equal 2.25 to achieve a neutralized circuit. For the purpose of this explanation, the various lead and neutralizing inductances may be ignored since the reactances thereof vary approximately equally with change in frequency and, therefore, balance each other in the bridge circuit.

Now it should be noted that $Cn1$ and $Cn2$ are ganged for simultaneous tuning wherein the capacitive change for each capacitor is approximately the same. However, in explaining the importance of this feature of ganging the two capacitors, the condition of separate tuning of the two should first be examined.

First, keeping in mind the numerical example given above, assume the two neutralizing capacitors to be detuned. In tuning, one of the capacitors is adjusted to within the range of 1 and 2.25 micromicrofarads for purposes which will become apparent hereafter. Next the other capacitor is adjusted to value which when multiplied by the value of the first adjusted capacity provides a capacitive product of 2.25 mmf. The circuit is now said to be neutralized.

This structual and functional arrangement for obtaining a neutralized circuit possesses certain inherent disadvantages which are particularly pronounced in the mass production of neutralized amplifier circuits causing inferior operation thereof.

It may be easily shown as important that the neutralized push-pull circuit be neutralized by means of capacitors having substantially equal values. This is so, because for practical purposes, the grid-plate capacities of the two push-pull tube sections are equal. However, as shown in the foregoing, neutralization may be obtained by neutralizing capacitors of unequal values and this leads to circuit unbalance.

So, it becomes evident that a method for varying the neutralizing capacitors equally is essential. This may be achieved by the use of ganged neutralizing capacitors as taught by this invention.

Since the neutralizing inductances can be fixed for reasonable changes in operating frequency, such as 50 megacycles to 200 megacycles, by the use of this invention it is possible to neutralize a push-pull circuit both capacitively and inductively over a wide range of operating frequencies by means of a single adjustment.

Gang tuning of the two neutralizing capacitors affords the single adjustment. Starting from a "wide open" or minimum capacitance position, the capacitors are increased in value at the same rate until the product thereof equals 2.25 mmf. Only one setting of the ganged capacitors will satisfy neutralization requirements, since the product of the two capacities varies as the square of one.

In mass production, it is obvious that this gang tuning principle possesses a high degree of importance in (*a*) reducing cost of manufacture, (*b*) accurately balancing out the effects of the grid-to-plate capacitances, (*c*) providing a mechanically stable arrangement, (*d*) quickly obtaining neutralized condition, (*e*) reliability of consistent operation, and (*f*) providing a truly balanced circuit. Other significant advantages have been explained hereinbefore.

All variations of the foregoing invention which would occur to a person skilled in the art are intended to be covered by the claims appended hereto.

I claim:

1. A circuit stabilizing device for a push pull amplifier comprising a flat fiber base, a first pair of elongated condenser plates mounted on said base in parallel spaced relation, said plates having parallel lugs which extend outwardly from said base in the plane thereof, the first plate being constituted by a metal strap which passes through an opening in said base and which is bent to have parallel extending legs which lie on opposite sides of said base, said legs terminating in one of the aforesaid lugs, the second plate being substantially identical to the first plate and being similarly mounted on said base, said second plate having a leaf portion which extends laterally from one leg thereof into variably spaced juxtaposition with one leg of the first plate to form a variable capacitor therewith, a second pair of elongated condenser plates which are mounted on said base and which superpose in parallel relation respective ones of said first pair of plates but on the side of said base opposite the aforementioned leaf, the respective juxtaposed plates forming a pair of substantially identical capacitors, a flat fiber tuning member adjustably mounted on said base and operable to engage said second pair of plates to adjust the latter simultaneously toward and away from said first pair of plates to provide gang tuning thereof, and a pair of substantially identical but oppositely wound inductors installed in companion openings in said base in symmetrical relation with respect to the first and second pairs of condenser plates, each of said inductors having one end connected to a respective one of the second pair of plates, the remaining end of each inductor serving as a solder lug.

2. A circuit stabilizing device for a push pull amplifier comprising a flat fiber base, a first pair of elongated condenser plates mounted on said base in parallel spaced relation, said plates having parallel lugs which extend outwardly from said base in the plane thereof, the first of said pair of plates being constituted by two flat parallel extending legs which lie on opposite sides of said base, said legs terminating in one of the aforesaid lugs, the second plate being substantially identical to the first plate and being similarly mounted on said base, said second plate having a leaf portion which extends laterally from one leg thereof into variably spaced juxtaposition with one leg of the first plate to form a variable capacitor therewith, a second pair of elongated condenser plates which are mounted on said base and which superpose in parallel relation respective ones of said first pair of plates but on the side of said base opposite the aforementioned leaf, the respective juxtaposed plates forming a pair of substantially identical capacitors, a flat fiber tuning member adjustably mounted on said base and operable to engage said second pair of plates to adjust the latter simultaneously toward and away from said first pair of plates to provide gang tuning thereof, and a pair of substantially identical but oppositely wound inductors installed in companion openings in said base in symmetrical relation with respect to the first and second pairs of condenser plates, each of said inductors having one end connected to a respective one of the second pair of plates, the remaining end of each inductor serving as a solder lug.

3. A circuit stabilizing device for a push pull amplifier comprising a flat fiber base, a first pair of elongated condenser plates mounted on said base in parallel spaced relation, said plates having parallel lugs which extend outwardly from said base in the plane thereof, one of said plates having a leaf portion which extends laterally therefrom into juxtaposition with the other of said plates to form a capacitor therewith, a second pair of elongated condenser plates which are mounted on said base and which superpose in parallel relation respective ones of said first pair of plates but on the side of said base opposite the aforementioned leaf, the respective juxtaposed plates forming a pair of substantially identical capacitors, a flat fiber tuning member adjustably mounted on said base and operable to engage said second pair of plates to adjust the latter simultaneously toward and away from said first pair of plates to provide gang tuning thereof, and a pair of substantially identical but oppositely wound inductors installed in companion openings in said base in symmetrical relation with respect to the first and second pairs of condenser plates, each of said inductors having one end connected to a respective one of the second pair of plates, the remaining end of each inductor serving as a solder lug.

4. A circuit stabilizing device for a push pull amplifier comprising a flat base, a first pair of condenser plates mounted on said base in parallel spaced relation, one of said plates having a leaf portion which extends laterally therefrom into juxtaposition with the other of said plates to form a capacitor therewith, a second pair of condenser plates which are mounted on said base and which superpose in parallel relation respective ones of said first pair of plates but on the side of said base opposite the aforementioned leaf, the respective juxtaposed plates forming a pair of substantially identical capacitors, a flat tuning member adjustably mounted on said base and operable to engage said second pair of plates to adjust the latter simultaneously toward and away from said first pair of plates to provide gang tuning thereof, and a pair of substantially identical but oppositely wound inductors installed in said base in symmetrical relation with respect to the first and second pairs of condenser plates, each of said inductors having one end connected to a respective one of the second pair of plates, the remaining end of each inductor serving as a solder lug.

5. A circuit stabilizing device for a push pull amplifier comprising a flat base, a first pair of condenser plates mounted on said base in parallel spaced relation, one of said plates having a leaf portion which extends laterally therefrom into juxtaposition with the other of said plates to form a capacitor therewith, a second pair of condenser plates which are mounted on said base and which superpose in parallel relation respective ones of said first pair of plates but on the side of said base opposite the aforementioned leaf, the respective juxtaposed plates forming a pair of substantially identical capacitors, and a flat tuning member adjustably mounted on said base and operable to engage said second pair of plates to adjust the latter simultaneously toward and away from said first pair of plates to provide gang tuning thereof.

6. A circuit stabilizing device for a push pull amplifier comprising a flat base formed of insulating material, a pair of gang tuned substantially identical variable capacitors, each capacitor being constituted by two plates, one fixed and the other variable, the variable plates being disposed on one side of said base, a third capacitor disposed on the other side of said base and constituted by two plates, one plate of the third capacitor being common to one of the aforementioned fixed plates, and the other plate of the third capacitor being a leaf flexibly connected to the other of the aforementioned fixed plates, dielectric members interposed between the respective capacitor plates to prevent shorting therebetween, a flat member formed of insulating material adjustably mounted on said base and engageable with the two variable plates of the first mentioned pair of capacitors for gang tuning thereof, and an adjusting member for the third capacitor and operatively engageable with both said leaf and said base for varying the spacing between the third capacitor plates.

7. A circuit stabilizing device for a push pull amplifier comprising a flat base formed of insulating material, a pair of gang tuned substantially identical variable capacitors, each capacitor being constituted by two plates, one fixed and the other variable, the variable plates being disposed on one side of said base, a third capacitor disposed on the other side of said base and constituted by two plates, one plate of the third capacitor being common to one of the aforementioned fixed plates, and the other plate of the third capacitor being a leaf flexibly connected to the other of the aforementioned fixed plates, a flat member formed of insulating material adjustably mounted on said base and engageable with the two variable plates of the first mentioned pair of capacitors for gang tuning thereof, and an adjusting member for the third capacitor and operatively engageable with both said leaf and said base for varying the spacing between the third capacitor plates.

8. A circuit stabilizing device for a push pull amplifier comprising a flat base formed of insulating material, a pair of gang tuned substantially identical variable capacitors, each capacitor being constituted by two plates, one fixed and the other variable, the variable plates being disposed on one side of said base, a third capacitor disposed on the other side of said base and constituted by two plates, one plate of the third capacitor being common to one of the aforementioned fixed plates, and the other plate of the third capacitor being a leaf flexibly connected to the other of the aforementioned fixed plates, tuning means mounted on said base and engageable with the two variable plates of the first mentioned pair of capacitors for gang tuning thereof, and an adjusting means for the third capacitor and operatively engageable with both said leaf and said base for varying the spacing between the third capacitor plates.

9. A circuit stabilizing device for a push pull amplifier comprising a flat base formed of insulating material, a pair of gang tuned substantially identical variable capacitors, each capacitor being constituted by two plates, one fixed and the other variable, the variable plates being disposed on one side of said base, a third capacitor disposed on the other side of said base and constituted by two plates, one plate of the third capacitor being common to one of the aforementioned fixed plates, and the other plate of the third capacitor being a leaf flexibly connected to the other of the aforementioned fixed plates, and tuning means cooperatively associated with said base and engageable with the two variable plates of the first mentioned pair of capacitors for gang tuning thereof, and an adjusting means for the third capacitor and operatively engageable with both said leaf and said base for varying the spacing between the third capacitor plates.

10. The device of claim 1 and having threaded in at least one of said inductors a brass slug for varying the inductance thereof.

11. A circuit stabilizing device for a push pull amplifier comprising a pair of gang tuned substantially identical variable capacitors, each capacitor including two relatively movable plates, a third capacitor including two plates, one of the third capacitor plates being common to one of the plates of one of said pair of capacitors, the other plate of said third capacitor being a leaf flexibly connected to one plate of the other of said pair of capacitors, means for gang tuning said pair of variable capacitors, and means for varying the capacity of said third capacitor.

12. A circuit stabilizing device for a push pull amplifier comprising a pair of gang tuned substantially identical variable capacitors, each capacitor including two relatively movable plates, a third capacitor including two plates, one of the third capacitor plates being common to one of the plates of one of said pair of capacitors, the other plate of said third capacitor being conductively connected to one plate of the other of said pair of capacitors, means for gang tuning said pair of variable capacitors, and means for varying the capacity of said third capacitor.

References Cited in the file of this patent

UNITED STATES PATENTS

| | | |
|---|---|---|
| 1,930,523 | Landon | Oct. 17, 1933 |
| 2,055,431 | Garvey | Sept. 22, 1936 |
| 2,091,616 | Stoekle | Aug. 31, 1937 |
| 2,129,313 | Whitelock | Sept. 6, 1938 |
| 2,475,144 | Kodama et al. | July 5, 1949 |
| 2,519,009 | Wolfe | Aug. 15, 1950 |
| 2,616,988 | Rodenhuis | Nov. 4, 1952 |